United States Patent Office 3,726,852
Patented Apr. 10, 1973

3,726,852
BICARBONATE SALTS OF INDAZOLIUM AND BENZIMIDAZOLIUM DYESTUFFS
Pierre Joseph Frederic Calla, Rouen, Louis Marie Joseph Berthelot, St. Etienne-du-Rouvray, Robert Frederic Michel Sureau, Enghien-les-Bains, and Gilbert Victor Henri Kremer, Ermont, France, assignors to Eugine Kuhlmann, Paris, France
No Drawing. Continuation of application Ser. No. 659,886, Aug. 11, 1967. This application May 22, 1970, Ser. No. 41,669
Claims priority, application France, Sept. 8, 1966, 75,624
Int. Cl. C09b 29/36, 29/38, 43/00
U.S. Cl. 260—157                              3 Claims

ABSTRACT OF THE DISCLOSURE

A bicarbonate salt of an indazolium or benzimidazolium dyestuff which is useful for the preparation of concentrated solutions of dyestuffs. The concentrated solutions can be diluted and used as dyebaths. The bicarbonate has the general formula

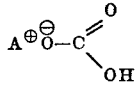

Two typical formulae for $A^{\oplus}$ are as follows

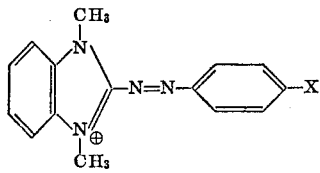

and

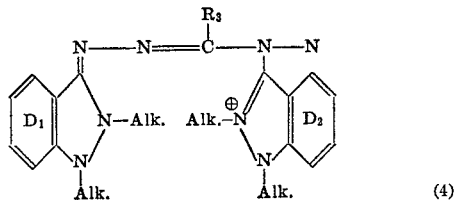

where X is hydrogen, chlorine, methyl or methoxy, the benzene nuclei $D_1$ and $D_2$ are unsubstituted or substituted by chlorine or nitro, $R_3$ is hydrogen, alkyl having 1 to 3 inclusive carbon atoms, phenyl or p-amino-phenyl, and Alk. represents methyl or ethyl. Other formulae for $A^{\oplus}$ are given.

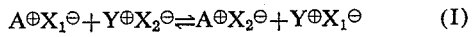

This application is a continuation of application Ser. No. 659,886, filed Aug. 11, 1967, now abandoned.

The present invention relates to new salts of cationic dyestuffs and process for their preparation.

It is known that the addition of an electrolyte $Y^{\oplus}X_2^{\ominus}$ to the aqueous solution of a cationic dyestuff $A^{\oplus}X_1^{\ominus}$ starts an equilibrium reaction according to the scheme:

$$A^{\oplus}X_1^{\ominus}+Y^{\oplus}X_2^{\ominus}\rightleftarrows A^{\oplus}X_2^{\ominus}+Y^{\oplus}X_1^{\ominus} \quad (I)$$

The equilibrium is displaced more towards the right as the relative concentration of the ions $X_2^{\ominus}$ with respect to that of the ions $X_1^{\ominus}$ becomes greater. The best conditions for displacing the equilibrium to the right are thus usually obtained by the use of a salt $Y^{\oplus}X_2^{\ominus}$ which is much dissociated and in amount as large as its solubility under experimental conditions makes it possible.

However, these conditions are not indispensable for a total displacement of the equilibrium to the right if, on application of the first form of Berthollet's laws, the salt $A^{\oplus}X_2^{\ominus}$ is insoluble or sparingly soluble.

When $Y^{\oplus}X_2^{\ominus}$ is a bicarbonate $Y$—$CO_3H$ in the scheme (I), $Y^{\oplus}$ representing a monovalent cation, for example a cation of an alkali metal, the reaction $$A^{\oplus}X_1^{\ominus}+Y^{\oplus}CO_3H^{\ominus}\rightarrow A^{\oplus}CO_3H^{\ominus}+Y^{\oplus}X_1^{\ominus} \quad (II)$$

can only be complied with if the salt $A^{\oplus}CO_3H^{\ominus}$ on the one hand is sufficiently stable for the corresponding hydroxide $A^{\oplus}OH^{\ominus}$ not to be liberated under the temperature conditions of the reaction and on the other hand is insoluble or much less soluble than the initial salt $A^{\oplus}X_1^{\ominus}$.

It was unexpected that these conditions of stability and relative insolubility could be realised simultaneously for cationic dyestuffs containing the atomic grouping of the formula:

in which one Y represents an

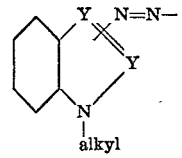

alkyl group and the other represents a carbon atom linked to the azo group. Dyestuffs of this type have been described, for example, in U.S. Pats. Nos. 3,173,905 and 3,324,104 and in U.S. patent applications Nos. 428,198 of Jan. 26, 1965 and 477,969 of Aug. 6, 1965 now U.S. Pat. No. 3,360,508.

The present invention relates to the bicarbonates of cationic dyestuffs containing the group of atoms defined above. These salts are of great technical interest for the preparation of concentrated solutions of dyestuffs of this type in organic acids. In fact, as a result of the loss of carbon dioxide, the reaction (III) below is total:

$$A^{\oplus}CO_3H^{\ominus}+RCO_2^{\ominus}H^{\oplus}\rightarrow A^{\oplus}RCO_2^{\ominus}+CO_2+H_2O \quad (III)$$

The salts $^{\oplus}RCO_2^{\ominus}$ obtained according to this process have the peculiarity of being extremely soluble in the acids $RCO_2H$ employed in reaction (III), these acids being used pure or more or less dilute. Acids of this type which are preferably used are the first members of the aliphatic series miscible with water, especially formic acid, acetic acid, monochloracetic acid, propionic acid, dichloracetic acid, trichloracetic acid, lactic acid, tartaric acid, succinic acid or maleic acid.

The process according to the invention thus enables solutions to be prepared at much higher concentrations than those which could be obtained on dissolving the salts $A^{\oplus}X_1^{\ominus}$ directly in the same acids.

Another method of preparation of such concentrated solutions has already been proposed, which consists in removing the hydroxyl bases $A^{\oplus}OH^{\ominus}$ from their salts $A^{\oplus}X_1^{\ominus}$ by means of strong alkaline agents such as caustic soda, isolating these bases and taking them up in an organic acid. This process is only applicable however in very special cases. It fails particularly in the case of dyestuffs containing a cyclic quaternary nitrogen atom connected with an azo linkage by a series of conjugated double bonds. In fact, in this case the corresponding hydroxyl base $A^{\oplus}OH^{\ominus}$ cannot be isolated, either because it is not displaceable by the strong alkaline agents, or on account of its extreme instability. The new process according to the invention therefore provides a very useful contribution to the technique.

In order to prepare bicarbonates of cationic dyestuffs containing the group of atoms defined above by one embodiment of the invention the dyestuff $A^{\oplus}X_1^{\ominus}$, in total or partial aqueous solution, is treated with an alkali metal bicarbonate at a temperature between the ambient temperature and about 60° C., preferably between 50° C. and 60° C. The quantity of bicarbonate used varies from the stoichiometric amount to a large excess limited merely by the necessity to dissolve this salt in the reaction medium. However, when the bicarbonate of the dyestuff is insoluble or sparingly soluble, a small excess over the theoretical is sufficient. In some cases, for example when the solubility of the initial dyestuff $A^{\oplus}X_1^{\ominus}$ is limited, it may be advantageous to work under a slight carbon dioxide pressure that is to say under an atmosphere of carbon dioxide at a pressure greater than atmospheric pressure, which enables the temperature of the reaction on occasion to be increased—up to about 80° C.—without fear of decomposition of the bicarbonate. The bicarbonate of the dyestuff $A^{\oplus}CO_3H^{\ominus}$ which precipitates is filtered off, washed with a bicarbonate solution, then with water until the ions $X_1^{\ominus}$ have disappeared as completely as possible, and then drained and dried.

For the preparation of the salts of dyestuffs $A^{\oplus}RCO_2^{\ominus}$, the bicarbonate of the dyestuff obtained, after draining or drying, can be made into a paste in the selected organic acid in which it dissolves very readily, even in the cold, with evolution of carbon dioxide. The solution can be hastened by slightly raising the temperature. The dyestuff bicarbonate may also be treated with a solution of the organic acid in water or in a solvent miscible with water, or the suspension of the bicarbonate in water or in an aqueous solvent may be treated with the selected acid in a sufficient or slightly excess quantity. Mineral acids may be used instead of the organic acids. Stable solutions containing calculated contents of anions $A^{\oplus}$ from 20% to 50% are thus perfectly realisable. These solutions may in some cases be concentrated until crystallisation takes place, or even atomised. Solutions and solid salts are thus obtained in a state of very great purity, practically free from mineral salts.

In the following examples to which the invention is not limited the parts indicated are parts by weight unless the contrary is stated.

EXAMPLE 1

112 parts of 5-nitro-1,2-dimethyl-3-indazolone-hydrazone hydrochloride are coupled with 74 parts of N-diethyl-m-toluidine in the presence of sodium chloride. After draining, 232 parts of 4'-diethylamino-2'-methyl-3-phenylazo-5-nitro-1,2-dimethyl-indazolium chloride are obtained which are made into a paste in 2000 parts of water. This is heated to 55° C. and 200 parts of sodium bicarbonate are added portionwise. The temperature is maintained at 55° C. for 2 hours, then the product is allowed to cool while agitation is continued for 12 hours. It is filtered and the precipitate is washed with a 5% solution of sodium bicarbonate until chlorine ions have disappeared from the filtrate, then drained and the still moist precipitate thus obtained is treated with sufficient glacial acetic acid to give a total volume of 500 parts. A solution is thus obtained which is free from insoluble matter, perfectly stable on keeping and does not crystallise on cooling to 0° C.

The total elimination of the chlorine ions from the filtrate can advantageously be obtained by the addition of lead acetate.

On operating under the conditions of the preceding example with the chlorides of the dyestuffs in the following table, concentrated acetic acid solutions are obtained which are perfectly stable on keeping and do not crystallise on cooling to 0° C.

| | |
|---|---|
| 2 | 6,6'-dinitro derivative of the compound of Formula IV. |
| 3 | 5,5'-dinitro derivative of the compound of Formula IV. |

(IV)

| | |
|---|---|
| 4 | Compound of formula V in which $R = CH_3$. |
| 5 | Compound of formula V in which $R = H$. |

(V)

| | |
|---|---|
| 6 | 4'-amino-3-phenylazo-1,2-dimethyl-indazolium. |
| 7 | 4'-diethylamino-3-phenylazo-5-nitro-1,2-dimethylindazolium. |
| 8 | 4'-amino-3-phenylazo-5-nitro-1,2-dimethyl-indazolium. |
| 9 | 2'-acetylamino-4'-amino-3-phenylazo-5-nitro-1,2-dimethyl-indazolium. |
| 10 | 2'-acetylamino-4'-amino-3-phenylazo-6-nitro-1,2-dimethyl-indazolium. |
| 11 | 4'-amino-3-phenylazo-5-chloro-1,2-dimethyl-indazolium. |
| 12 | 4'-amino-3-phenylazo-5,7-dichloro-1,2-dimethyl-indazolium. |
| 13 | 2-phenylazo-1,3-dimethyl-benzimidazolium. |
| 14 | 4'-methyl-2-phenylazo-1,3-dimethyl-benzimidazolium. |
| 15 | 4'-methoxy-2-phenylazo-1,3-dimethyl-benzimidazolium. |
| 16 | 4'-chloro-2-phenylazo-1,3-dimethyl-benzimidazolium. |

EXAMPLE 17

A moist paste containing 22.1 parts of the bicarbonate of the dyestuff used in Example 1 is made into a paste in 200 parts of water at 50° C. 10 parts by volume of 10 N hydrochloric acid are slowly introduced. Copious evolution of carbon dioxide is observed. The product is allowed to cool while stirring is continued, then the solid is filtered off, drained and dried in vacuo. 20 parts of the chloride of the dyestuff free from mineral salts are obtained.

EXAMPLE 18

On replacing in Example 1 the 4'-diethylamino-2'-methyl-3-phenylazo - 5 - nitro - 1,2 - dimethylindazolium chloride by an equivalent quantity of the sulphomethylate of the same dyestuff, under identical conditions a concentrated acetic acid solution of this dyestuff is obtained through its bicarbonate.

We claim:

1. A bicarbonate of the formula:

wherein the $NO_2$ groups are in the 5 or 6 positions.

2. A bicarbonate of the formula:

wherein R is hydrogen or methyl.

3. A bicarbonate of the formula:

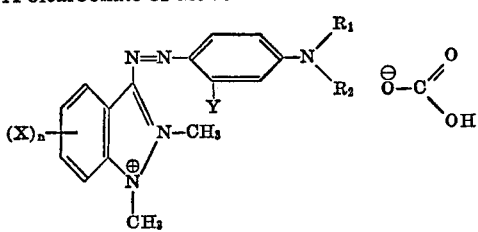

wherein $R_1$ and $R_2$ each represent hydrogen, methyl or ethyl, Y represents hydrogen, methyl or acetylamino, X represents hydrogen, chlorine or nitro, and $n$ is 1 or 2.

References Cited
UNITED STATES PATENTS

| | | | |
|---|---|---|---|
| 3,078,137 | 2/1963 | Baumann et al. | 260—157 |
| 3,121,710 | 2/1964 | Sureau et al. | 260—146 |
| 3,160,467 | 12/1964 | Sureau et al. | 260—147 X |
| 3,173,905 | 3/1965 | Sureau et al. | 260—162 |
| 3,200,108 | 8/1965 | Kremel et al. | 260—157 |
| 3,257,378 | 6/1966 | Sureau et al. | 260—162 X |
| 3,294,777 | 12/1963 | Hansen et al. | 260—157 |
| 3,324,104 | 6/1967 | Sureau et al. | 260—157 |
| 3,331,852 | 7/1967 | Sureau et al. | 260—157 X |
| 3,332,930 | 7/1967 | Mohr et al. | 260—157 X |
| 3,360,508 | 12/1967 | Sureau et al. | 260—163 |
| 3,417,075 | 12/1968 | Mingasson et al. | 260—157 |
| 3,524,843 | 8/1970 | Kremer et al. | 260—163 |

FLOYD DALE HIGEL, Primary Examiner

U.S. Cl. X.R.

8—82, 92; 260—162